3,560,563
2-(p-ALKYLPHENYL)-N-SULFONYLALKANOYL-AMIDES

Scott J. Childress, Philadelphia, and J Lester Szabo, West Chester, Pa., assignors to American Home Products Corporation, New York, N.Y.
No Drawing. Filed June 3, 1969, Ser. No. 830,118
Int. Cl. C07c 143/74, 143/78
U.S. Cl. 260—556    4 Claims

ABSTRACT OF THE DISCLOSURE

This invention concerns 2-(p-alkylphenyl)-N-sulfonyl-alkanoyl-amides which are pharmacologically active as anti-inflammatory agents and are also substantially non-irritating to the gastrointestinal tract upon oral administration.

---

The present invention relates to new and novel amides. In particular, it concerns 2-(p-alkylphenyl)-N-sulfonyl-alkanoylamides which in standard and accepted biological tests have demonstrated anti-inflammatory activity. Further, these compounds are substantially non-irritating to the gastrointestinal tract of animals upon oral ingestion.

The new and novel compounds within the scope of the present invention are represented by the following formula:

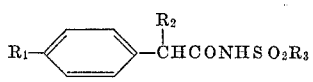

wherein $R_1$ is lower alkyl containing from about 4 to about 6 carbon atoms; $R_2$ is selected from the group consisting of hydrogen and lower alkyl; $R_3$ is selected from the group consisting of lower alkyl, phenyl, halophenyl, lower alkylphenyl and lower alkoxyphenyl. As employed herein the terms "lower alkyl," "lower alkoxy" and the like, except if otherwise limited, are meant to include both branched and straight chain hydrocarbon groups having from one to about seven carbon atoms. The term "halogen" as used herein is meant to include: chlorine, bromine, fluorine and iodine. Typical examples of these compounds are: 2-(p-isobutylphenyl)-N-methylsulfonyl-acetamide; N-(p-chlorophenyl)sulfonyl - 2-(p-isobutylphenyl)acetamide; and 2-(p-isobutylphenyl)-N-(p-tosyl)-propionamide.

The new and novel compounds of the present invention may be prepared by the hereinafter exemplified reaction scheme:

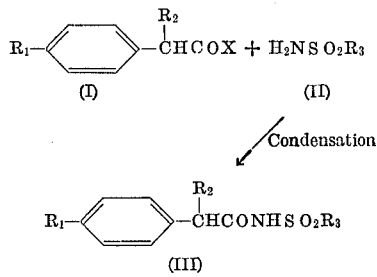

wherein $R_1$, $R_2$, and $R_3$ are defined as above and X is halogen. The condensation reaction is effected by contacting a carboxylic acid halide (I) with an appropriate sulfonamide (II) in a water-immiscible, reaction-inert organic solvent at about reflux temperatures for a period of up to about one hour. Preferably this reaction is conducted using an acid chloride (II) in pyridine at the reflux temperature of the reaction mixture for a period of about fifteen minutes.

When the condensation reaction is complete, the resulting 2-(p-alkylphenyl)-N-sulfonylalkanoylamide (III) is separated by standard recovery procedure. For example, the reaction mixture is cooled, washed with water, dried over magnesium sulfate, evaporated to dryness, the resulting residue triturated under a liquid alkane, e.g., hexane, filtered and dried to afford the product (III). The starting materials (I and II) employed in the above-described process are either commercially available or are readily prepared by procedures well known in the chemical art.

The new and novel 2 - (p - alkylphenyl)-N-sulfonyl-alkanoylamides (III) of the present invention possess valuable pharmacological activity. In particular, these compounds in standard pharmacological procedures demonstrate anti-inflammatory activity and are, therefore, useful as anti-inflammatory agents.

In the pharmacological evaluation of the anti-inflammatory properties of the compounds of this invention the in vivo effects of the compounds is assessed by their ability to inhibit experimentally-induced edema in the hind paw of the rat. Male Sprague-Dawley rats 120–165 grams are used. The compound is administered orally as a solution or suspension in physiological saline (plus 1 drop Tween 80) in a volume of 10 ml./kg. Each compound is given to six rats and vehicle alone is administered to six more rats as a control. Thirty minutes after drug administration edema is induced by an injection of 0.05 ml. of a 1% carrageenin solution in saline into the subplantar tissue of the rat's right hind paw. Paw volume is then immediately measured volumetrically with a plethysmograph and again three hours later. The mean volume of swelling for the control group is calculated and compared to the test groups. Compounds that inhibit swelling approximately 20% are considered active. Inhibition is calculated by the formula:

$$\text{Percent inhibition} = \frac{\text{Mean vol. swelling of control} - \text{mean vol. swelling of tests}}{\text{Mean vol. swelling of control}} \times 100$$

In the above procedure, the compounds (III) of the present invention demonstrated about a forty percent inhibition when administered orally at a dose of about 100 mg./kilo of body weight.

A particularly useful property of the 2-(p-alkylphenyl)-N-sulfonylalkanoylamides (III) of the present invention, is that, these compounds are substantially non-irritating to the gastrointestinal tract of animals when orally ingested.

When the 2-(p-alkylphenyl)-N-sulfonylalkanoylamides (II) of the present invention are employed orally as anti-inflammatory agents, which are not irritating to the gastrointestinal tract, they may be administered to animals, e.g. mice, rats, rabbits, dogs, cats, monkeys, etc. alone or in combination with pharmacologically acceptable carriers, the proportion of which is determined by the solubility and chemical nature of the compounds, chosen route of administration and standard biological practice. For example, they may be administered orally in the form containing such excipients as starch, milk sugar, and so forth. They may also be administered orally in the form of solutions or they may be injected parenterally.

The dosage of the present anti-inflammatory agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration:

EXAMPLE I

One-half gram of methanesulfonamide in benzene containing 3 ml. pyridine is warmed to near reflux and the acid chloride obtained from 1 g. p-isobutylphenylacetic acid in benzene is added over a period of several minutes. The reaction mixture is refluxed for fifteen minutes. Thereafter, it is cooled, admixed with water and the organic layer separated and again washed with water. The organic layer is then dried over $MgSO_4$ and evaporated in vacuo to a syrup which on trituration with hexane crystallizes to give the product which is washed with hexane and dried to afford 2-(p-isobutylphenyl)-N-methylsulfonylacetamide, M.P. 143–4° C.

*Analysis.*—Calc'd (percent): C, 58.0; H, 7.12; N, 5.2. Found (percent): C, 57.72; H, 6.99; N, 5.42.

EXAMPLE II

One gram of p-chlorobenzenesulfonamide in benzene containing 6 ml. pyridine is warmed to reflux and 2 grams of the acid chloride of p-isobutylphenylacetic acid in benzene is added over a period of several minutes. Heating is continued for about a half hour at reflux. Thereafter, the reaction mixture is cooled, water added, the organic layer separated and washed with water. The organic layer is then dried over $MgSO_4$ and evaporated in vacuo. The residue is triturated with hexane to afford N-(p-chlorophenylsulfonyl)-2-(p-isobutylphenyl)acetamide which is separated by filtration, washed with hexane and dried.

EXAMPLE III

When the procedure of Examples I and II is repeated to react a sulfonamide with an appropriate carboxylic acid chloride, the following compounds are obtained:

N-ethylsulfonyl-2-(p-hexylphenyl)butyramide;

2 - (p - isobutylphenyl)-N-(p-propoxyphenylsulfonyl)-acetamide;

N-(p-butylphenylsulfonyl)-2-(p-isobutyl)acetamide;

N-(o-fluorophenylsulfonyl)-2-(p-isobutyl)acetamide;

N - (p - methoxyphenylsulfonyl)-2-(p-t-pentylphenyl)-acetamide;

N - (p-bromophenylsulfonyl)-2-p-t-pentylphenyl)acetamide;

N-(p-bromophenylsulfonyl)-2-(p-t-pentylphenyl)-acetamide;

2-(p-isobutylphenyl)-N-(p-tosyl)propionamide;

N-propylsulfonyl-2-(p-hexylphenyl)acetamide; and 2-(p-isobutylphenyl)-N-phenylsulfonylacetamide.

What is claimed is:

1. A compound selected from those having the formula:

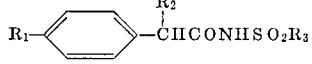

wherein $R_1$ is lower alkyl containing from 4 to 6 carbon atoms; $R_2$ is selected from the group consisting of hydrogen and lower alkyl; $R_3$ is selected from the group consisting of lower alkyl, phenyl, halophenyl, lower alkylphenyl and lower alkoxyphenyl.

2. A compound as described in claim 1 which is: 2-(p-isobutylphenyl)-N-methylsulfonylacetamide.

3. A compound as described in claim 1 which is: N-(p-chlorophenylsulfonyl)-2-(p-isobutylphenyl)acetamide.

4. A compound as described in claim 1 which is: 2-(p-isobutylphenyl)-N-(p-tosyl)propionamide.

References Cited

FOREIGN PATENTS 620,778   3/1949   Great Britain _____ 260—556Co

HENRY R. JILES, Primary Examiner

S. D. WINTERS, Assistant Examiner

U.S. Cl. X.R.

424—321; 260—544